(12) United States Patent
Kim et al.

(10) Patent No.: US 9,851,603 B2
(45) Date of Patent: Dec. 26, 2017

(54) OPTICAL COMPENSATION FILM AND LIQUID CRYSTAL DISPLAY INCLUDING THE SAME

(75) Inventors: Hee Kyung Kim, Seongnam-si (KR); Jang-Kun Song, Seoul (KR)

(73) Assignees: SAMSUNG ELECTRONICS CO., LTD., Gyeonggi-Do (KR); SUNGKYUNKWAN UNIVERSITY FOUNDATION FOR CORPORATE COLLABORATION, Gyeonggi-Do (KR)

( * ) Notice: Subject to any disclaimer, the term of this patent is extended or adjusted under 35 U.S.C. 154(b) by 250 days.

(21) Appl. No.: 13/447,805

(22) Filed: Apr. 16, 2012

(65) Prior Publication Data

US 2012/0327342 A1 Dec. 27, 2012

(30) Foreign Application Priority Data

Jun. 24, 2011 (KR) .................. 10-2011-0061908

(51) Int. Cl.
*G02F 1/1335* (2006.01)
*G02F 1/13363* (2006.01)

(52) U.S. Cl.
CPC ............ *G02F 1/13363* (2013.01); *G02F 2001/133633* (2013.01); *G02F 2413/04* (2013.01); *G02F 2413/06* (2013.01); *G02F 2413/12* (2013.01)

(58) Field of Classification Search
CPC ......... G02F 1/133634; G02F 1/133528; G02F 1/133632; G02F 2413/02; G02F 2001/133633; G02F 2413/12; G02F 2001/1398; G02F 2413/06; G02F 1/13363; G02F 2202/40; G02F 2001/133637; G02B 5/3016; C08J 5/18; C09K 19/38
USPC .................................... 349/117–121
See application file for complete search history.

(56) References Cited

U.S. PATENT DOCUMENTS

| | | | |
|---|---|---|---|
| 5,198,917 A * | 3/1993 | Togashi | G02F 1/133753 349/126 |
| 5,504,603 A * | 4/1996 | Winker | C23C 14/226 349/117 |
| 5,557,434 A * | 9/1996 | Winker et al. | 349/117 |
| 5,619,352 A | 4/1997 | Koch et al. | |
| 6,912,030 B1 * | 6/2005 | Coates et al. | 349/119 |
| 6,995,825 B2 | 2/2006 | Graham et al. | |
| 7,428,030 B2 * | 9/2008 | Kobayashi et al. | 349/122 |
| 7,477,343 B2 | 1/2009 | Skjonnemand et al. | |
| 7,515,231 B2 | 4/2009 | Hale et al. | |
| 7,538,841 B2 * | 5/2009 | Murakami et al. | 349/117 |
| 7,671,945 B2 | 3/2010 | Hale et al. | |
| 2002/0089629 A1 * | 7/2002 | Kim et al. | 349/117 |
| 2004/0183973 A1 * | 9/2004 | Roska et al. | 349/117 |
| 2005/0219447 A1 * | 10/2005 | Slaney et al. | 349/117 |
| 2006/0066804 A1 | 3/2006 | Tasaka | |

(Continued)

FOREIGN PATENT DOCUMENTS

| | | |
|---|---|---|
| JP | 2006091551 | 4/2006 |
| JP | 2010049192 | 3/2010 |
| JP | 2010107958 | 5/2010 |

*Primary Examiner* — Edward Glick
*Assistant Examiner* — David Chung
(74) *Attorney, Agent, or Firm* — Cantor Colburn LLP

(57) ABSTRACT

A compensation film for a liquid crystal film includes a first layer including splayed rod-shaped nematic liquid crystal material and a second layer disposed on a surface of the first layer and including at least one of a biaxial layer and an A-plate.

11 Claims, 19 Drawing Sheets

(56) References Cited

U.S. PATENT DOCUMENTS

2007/0085951 A1*  4/2007  Hale ................... G02F 1/13363
                                                              349/117
2007/0222927 A1*  9/2007  Uehara et al. ................ 349/117
2009/0128718 A1*  5/2009  Nakagawa ........................ 349/8
2009/0180056 A1   7/2009  Ohsawa et al.
2009/0231517 A1*  9/2009  Shiraogawa ...... G02F 1/133632
                                                               349/75

* cited by examiner

OPTICAL COMPENSATION FILM AND LIQUID CRYSTAL DISPLAY INCLUDING THE SAME

CROSS-REFERENCE TO RELATED APPLICATIONS

This application claims priority to Korean Patent Application No. 10-2011-0061908 filed on Jun. 24, 2011, and all the benefits accruing therefrom under 35 U.S.C. §119, the content of which in its entirety is herein incorporated by reference.

BACKGROUND

1. Field

Provided is a liquid crystal display and an optical compensation film for the liquid crystal display.

2. Description of the Related Art

A twisted nematic ("TN") mode liquid crystal display ("LCD") is widely used in various devices, such as a monitor and a television set, for example. In a TN mode LCD, a nematic liquid crystal material is typically homogeneously aligned with a slight pretilt angle, and the azimuthal angle of the liquid crystal molecules is gradually twisted from a substrate to the other substrate by about a right angle. The director of the liquid crystal molecules is varied by applying a vertical electric field to the liquid crystal layer of the TN LCD to adjust optical transmittance, thereby displaying images.

In the TN mode LCD, unlike vertical alignment ("VA") and in-plane switching ("IPS") mode LCD, the average direction of the liquid crystal director may point downward relative to the front direction such that image quality may be impaired when viewing the TN mode LCD upwardly and downwardly. However, the TN mode LCD has a better image quality in leftward and rightward directions compared to the VA and IPS mode LCD.

A wide-viewing ("WV") film may be used to improve the upward and downward viewing characteristics of the TN mode LCD. The WV film is manufactured by aligning a liquid crystal material with a discotic nematic phase such that the direction of the liquid crystal director gradually changes along the thickness direction.

However, discotic liquid crystal material, which is typically used in the WV film, may not be cost-effective when used for a large-sized WV film since the discotic liquid crystal materials are substantially expensive.

In addition, light leakage may occur in a black state of a normally white TN mode LCD, thereby decreasing the contrast ratio.

SUMMARY

In an embodiment, a compensation film for a liquid crystal display includes: a first layer including splayed rod-shaped nematic liquid crystal material; and a second layer disposed on a surface of the first layer and including at least one of a biaxial layer and an A-plate.

In an embodiment, an optical axis of the second layer may be at an angle of about 90 degrees with respect to a splay plane of the first layer, and liquid crystal molecules of the first layer may have polar angles decreasing as moving toward the second layer.

In an embodiment, a difference in the polar angles of the liquid crystal molecules at opposing surfaces of the first layer may be equal to or greater than about 30 degrees.

In an embodiment, retardation of the second layer in plane direction may be about 120 nanometers (nm) to about 220 nanometers (nm), retardation of the second layer in thickness direction may be about −80 nm to about −180 nm, and retardation of the first layer may be about 50 nm to about 150 nm.

In an embodiment, the splayed rod-shaped nematic liquid crystal material of the first layer may have a twist alignment with a twist angle in a range from about 2 degrees to about 10 degrees.

In an embodiment, the compensation film may further include: a polarizer disposed opposite to the first layer such that the second layer is interposed between the polarizer and the first layer; and a first protective layer disposed opposite to the second layer such that the polarizer is interposed between the first protective layer and the second layer.

In an embodiment, the compensation film may further include a second protective layer disposed between the polarizer and the second layer.

In another embodiment, a liquid crystal display includes: a twisted nematic mode liquid crystal panel; a compensation film disposed on an outer surface of the twisted nematic mode liquid crystal panel; and a polarizing film disposed on an outer surface of the compensation film, where the compensation film includes: a first layer including splayed rod-shaped nematic liquid crystal material; and a second layer disposed on an outer surface of the first layer and including at least one of a biaxial layer and an A-plate.

In an embodiment, an optical axis of the second layer may be at an angel of about 90 degrees with respect to a splay plane of the first layer, and liquid crystal molecules of the first layer may have polar angles decreasing as moving toward the second layer.

In an embodiment, a difference in the polar angles of the liquid crystal molecules at opposing surfaces of the first layer may be equal to or greater than about 30 degrees.

In an embodiment, retardation of the second layer in plane direction may be about 120 nm to about 220 nm, retardation of the second layer in thickness direction may be about −80 nm to about −180 nm, and retardation of the first layer may be about 50 nm to about 150 nm.

In an embodiment, the splayed rod-shaped nematic liquid crystal material of the first layer may have a twist alignment with a twist angle in a range from about 2 degrees to about 10 degrees.

In an embodiment, the polarizing film may include: a polarizer disposed on an outer surface of the second layer; and a first protective layer disposed on an outer surface of the polarizer.

In an embodiment, the polarizing film may further include a second protective layer disposed between the polarizer and the second layer.

In another embodiment, a liquid crystal display includes: a twisted nematic mode liquid crystal panel; a compensation film disposed on an outer surface of the panel; and a polarizing film disposed on an outer surface of the compensation film, where the compensation film discotic nematic liquid crystal material with a splay-twist alignment, and the twist angle of the compensation film is in a range from about 2 degrees to about 10 degrees.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
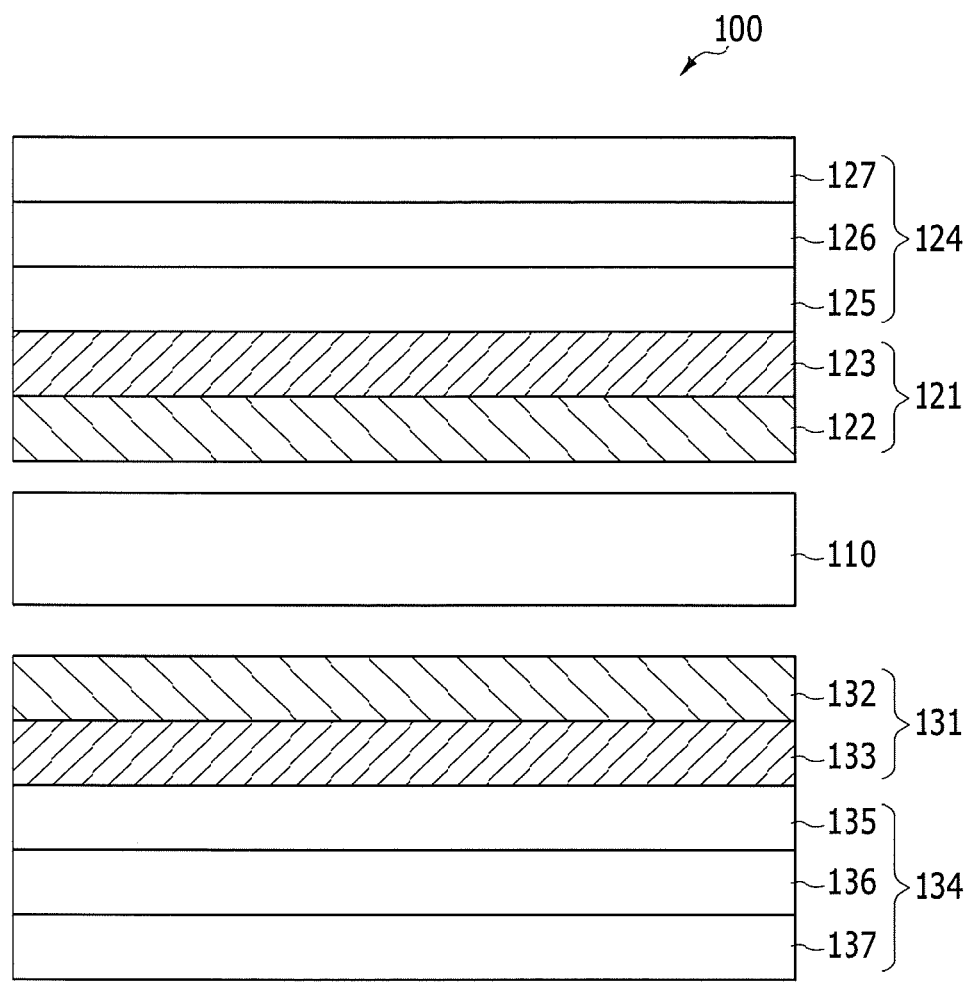
FIGS. 1 and 2 are schematic cross-sectional views of embodiments of a liquid crystal display ("LCD") including optical compensation films.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments will be described in further detail with reference to the accompanying drawings.

Embodiments of a liquid crystal display ("LCD") and an optical compensation film therefor will now be described in detail with reference to FIGS. 1 to 5.

Figure 2:
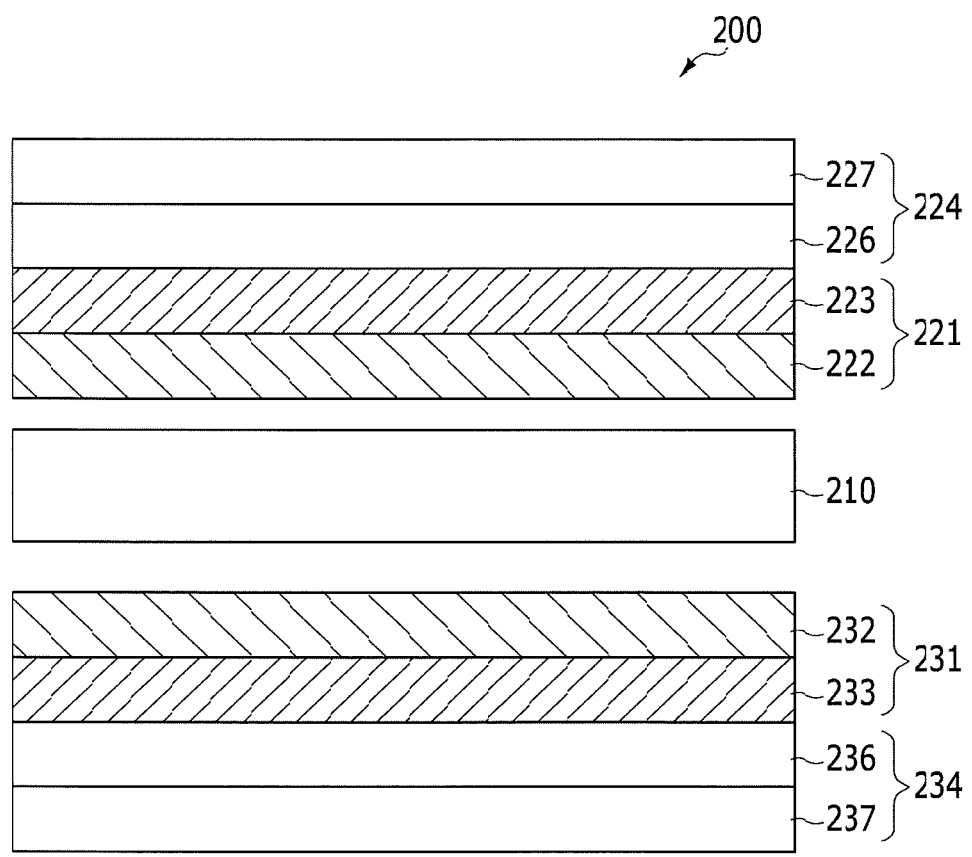
Figure 3:
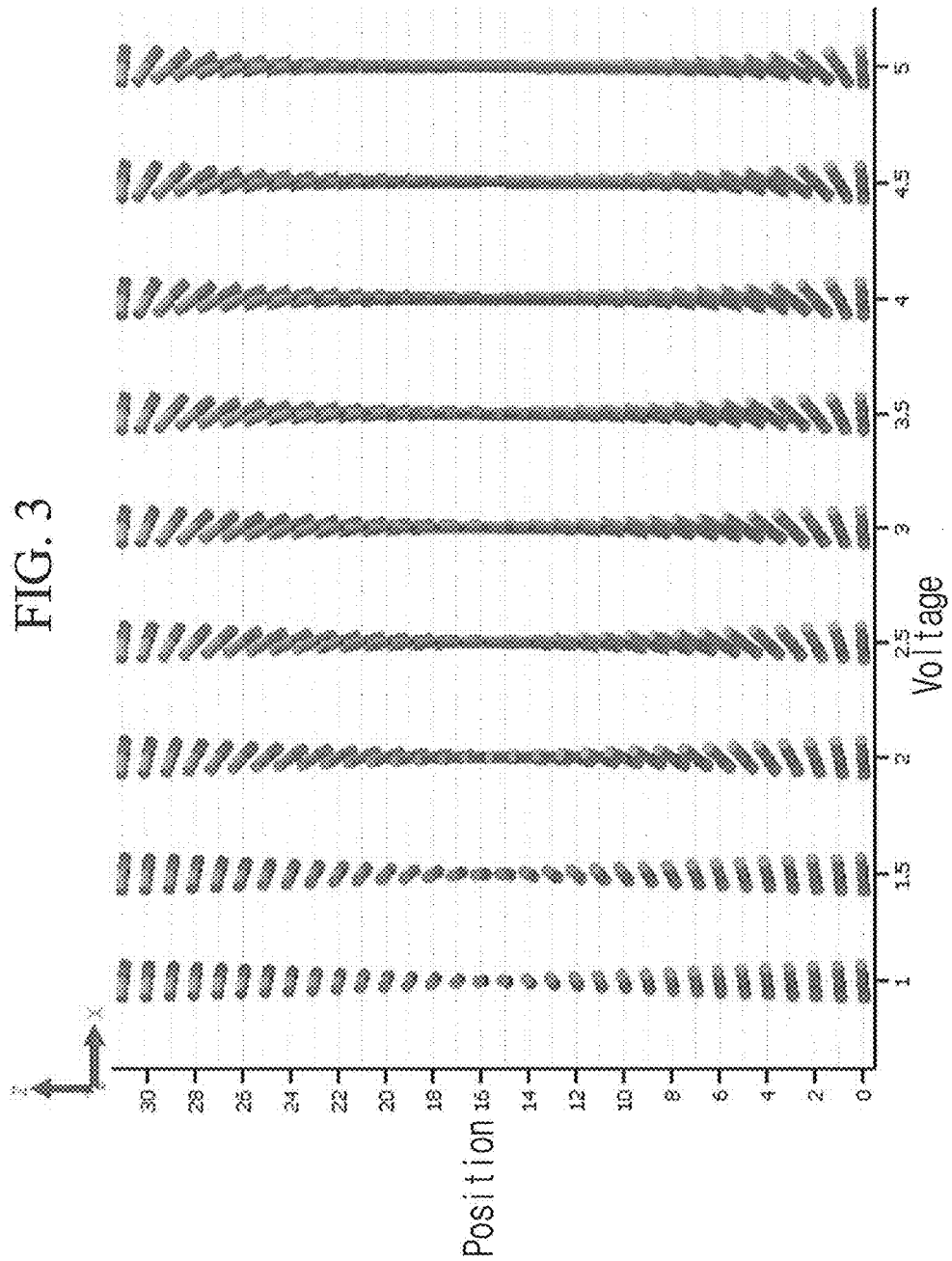
FIG. 3 is a schematic view of liquid crystal molecules in liquid crystal panels of the LCDs shown in FIGS. 1 and 2, showing arrangements thereof with respect to various voltages in the liquid crystal panels.
Figure 4:
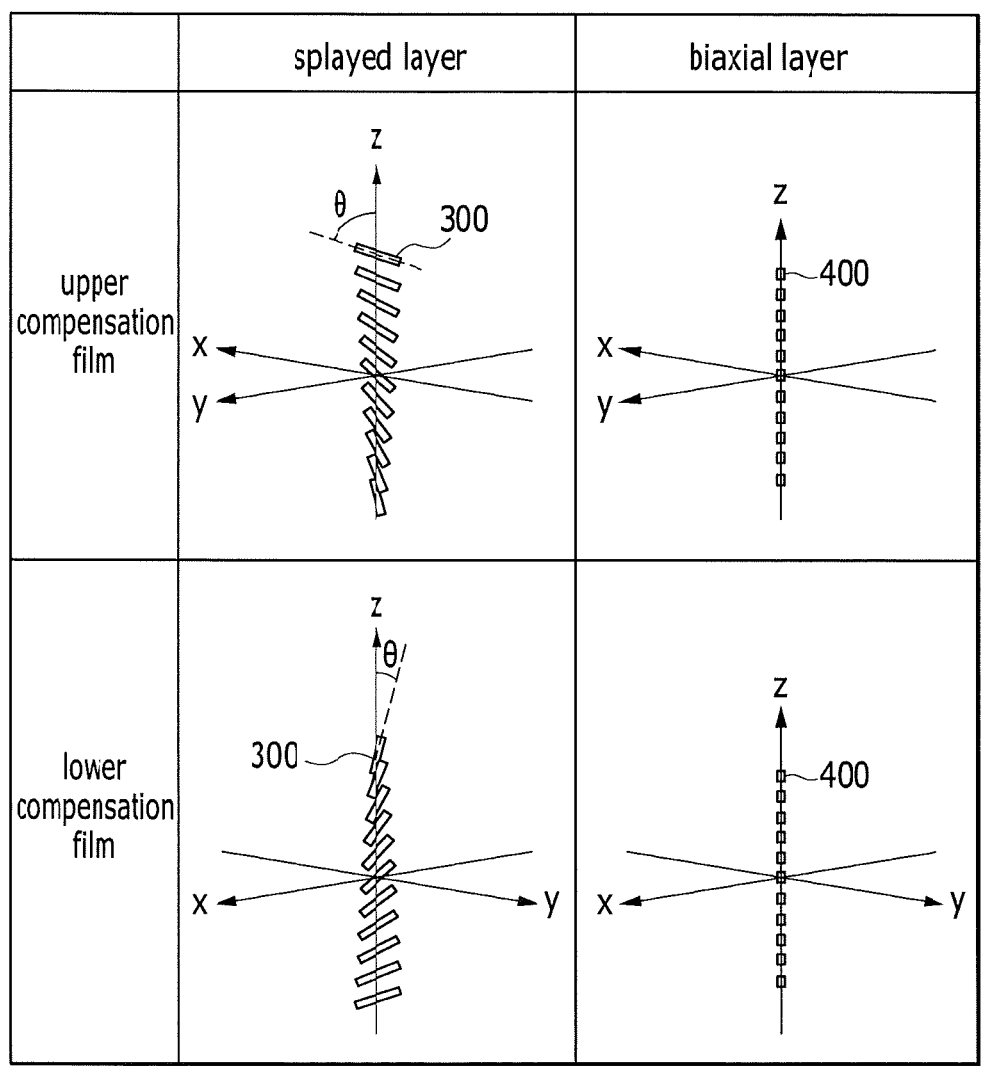
FIG. 4 is a schematic view of liquid crystal molecules in upper and lower compensation films shown in FIGS. 1 and 2, showing arrangements thereof.
Figure 5:
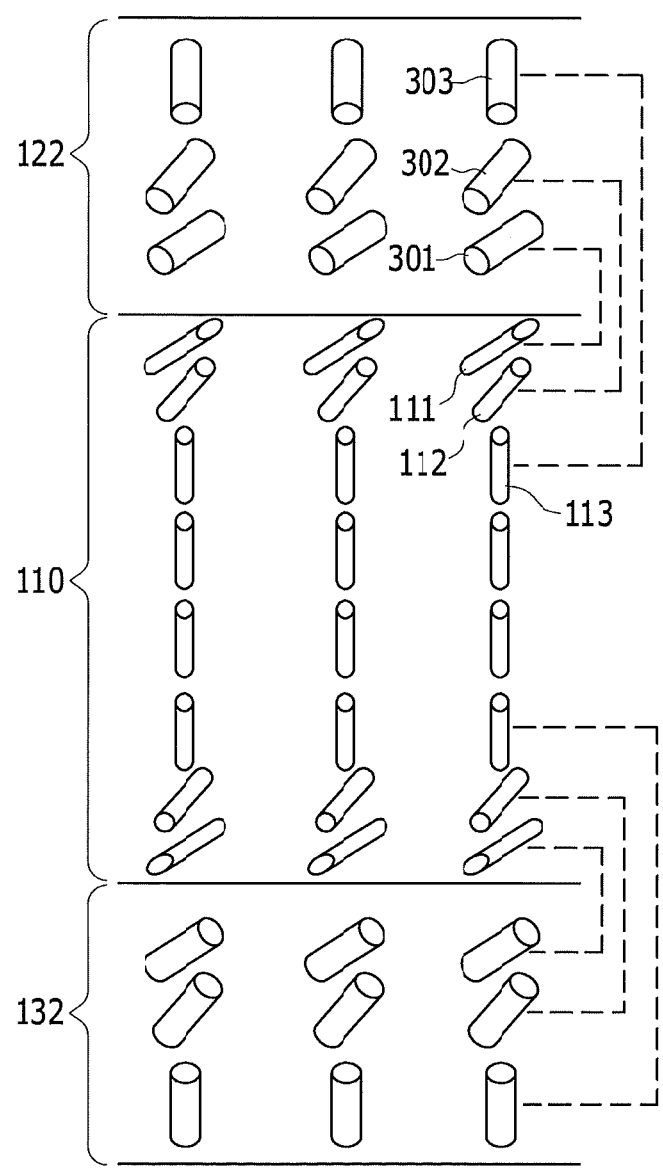
FIG. 5 is a schematic view of liquid crystal molecules in the liquid crystal panel and the compensation film shown in FIG. 1, showing arrangements thereof.

FIGS. 1 and 2 are schematic cross-sectional views of embodiments of LCDs including optical compensation films, FIG. 3 is a schematic view of liquid crystal molecules in liquid crystal panels of the LCDs shown in FIGS. 1 and 2, showing arrangements thereof with respect to various voltages in the liquid crystal panels, FIG. 4 is a schematic view of liquid crystal molecules in upper and lower compensation films shown in FIGS. 1 and 2, showing arrangements of the liquid crystal molecules, and FIG. 5 a schematic view of liquid crystal molecules in the liquid crystal panel and the compensation film shown in FIG. 1, showing arrangements of the liquid crystal molecules.

In an embodiment, as shown in FIG. 1, the LCD may be a twisted nematic ("TN") LCD including nematic liquid crystal material. In such an embodiment, the LCD may include a pair of optical compensation films (e.g., a first optical compensation film 121 and a second optical compensation film 131), a liquid crystal panel 110 disposed between inner surfaces of the optical compensation films 121 and 131, and a pair of polarizing films (e.g., a first polarizing film 124 and a second polarizing film 134) disposed on outer surfaces the compensation films 121 and 131, respectively.

Each of the optical compensation films 121 and 131 may have a dual-layered structure that includes a splayed layer 122 or 132 and a biaxial layer 123 or 133. The splayed layer 122 or 132 may be disposed close to the liquid crystal panel 110, while the biaxial layer 123 or 133 may be disposed close to a corresponding polarizing film 124 or 134 of the pair of polarizing films. In an embodiment, adhesive films (not shown) may be disposed between the compensation films 121 and 131 and the liquid crystal panel 110.

Each of the polarizing films 124 and 134 may include a polarizer 126 or 136 and protective layers 125, 127 or 135, 137 disposed on two opposing surfaces of the polarizer 126 or 136, e.g., outer and inner surfaces of the polarizer 126 or 136.

In an embodiment, each of the optical compensation films 121 or 131 and a corresponding polarizing film 124 or 134 may be formed as a single film, that is, may be formed as a single unitary and indivisible unit.

Hereinafter, a film or a layer 121 to 127 or 131 to 137 may be referred based on a position thereof relative to the liquid crystal panel 110 for convenience of description. In one embodiment, for example, the one disposed on the liquid crystal panel 110 among the pair of compensation films 121 and 131 may be referred to as an "upper" compensation film 121, while the other disposed under the liquid crystal panel 110 among the pair of compensation films 121 and 131 may be referred to as a "lower" compensation film 131.

Another embodiment of an LCD 200 shown in FIG. 2, which may be a TN LCD, may have substantially the same layered structure as the embodiment of the LCD 100 shown in FIG. 1. In such an embodiment, the LCD 200 may include a liquid crystal panel 210, upper and lower compensation films 221 and 231, and upper and lower polarizing films 224 and 234, and each of the upper and lower compensation films 221 and 231 may have a double layered structure including a splayed layer 222 or 232 and a biaxial layer 223 or 233.

In an embodiment, as shown in FIG. 2, the protective layers 135 and 125 disposed an inner surface of the polarizers 126 and 136 shown in FIG. 1 may be omitted. In such an embodiment, each of the polarizing films 224 and 234 in the LCD 200 may include a polarizer 226 or 236 and a single protective layer 227 or 237. The single protective layer 227 or 237 is disposed at the outer surface of the polarizer 226 or 236.

Referring to FIGS. 1 and 2, the liquid crystal panel 110 or 210 may include a pair of substrates (not shown) and a liquid crystal layer disposed between the substrates. In an embodiment, the liquid crystal layer may be a nematic liquid crystal layer.

Referring to FIG. 3, liquid crystal molecules in the liquid crystal layer may be homogeneously aligned with a slight pretilt angle. The liquid crystal molecules may gradually twist from one substrate to the other substrate by a predetermined angle, for example, by about 90 degrees. Such a liquid crystal alignment may be obtained by an alignment layer (not shown) disposed on an inner surface of a substrate. In one embodiment, for example, the homogeneous alignment of the liquid crystal molecules may be obtained by employing predetermined materials for the alignment layer, and the azimuthal angle of liquid crystal directors may be determined based on rubbing or irradiation of ultraviolet ray.

A plurality of electrodes (not shown) that generate vertical electric field in the liquid crystal layer may be disposed on the inner surfaces of the substrates.

FIG. 3 shows arrangements of liquid crystal molecules along the z-axis, which is vertical to the liquid crystal layer, when various voltages are applied to the electrodes. As shown in FIG. 3, as the voltage applied to the electrodes increases, i.e., as the electric field generated in the liquid crystal layer increases, the longitudinal directions of the liquid crystal molecules become more parallel to the direction of the electric field. However, liquid crystal molecules disposed substantially close to the inner surface of the substrate may tend to maintain their initial orientations since the liquid crystal molecules disposed substantially close to the inner surface of the substrate are affected more by the alignment layer than by the electric field.

Referring to FIG. 4, in an embodiment, the splayed layers 122, 132, 222 and 232 may include rod-type nematic liquid crystal molecules 300 that are splay-aligned. The liquid crystal molecules 300 in the splayed layers 122, 132, 222 and 232 may be aligned such that the polar angles θ of the liquid crystal molecules 300 increase as moving from the polarizing films 124 and 134 to the liquid crystal panel panels 110 and 210, and the difference in the polar angles θ from one surface to the opposing surface of the splayed layers 122, 132, 222 and 232 may be equal to or greater than about 30 degrees. In FIG. 4, a substantial portion of the longitudinal axes of the liquid crystal molecules 300 may be disposed on a plane (referred to as a "splay plane" hereinafter) that may make an angle of about 45 degrees with both the x-axis and the y-axis. Here, directions of the x-axis and the y-axis are corresponding to rubbing directions of the inner surfaces of the substrates of the liquid crystal panel 110 or 210, and the liquid crystal molecules in the liquid crystal panel 110 or 210 may be aligned along a direction of a vector sum of the rubbing directions of the inner surfaces of the substrates of the liquid crystal panel 110 or 210. In FIG. 4, the z-axis corresponds to a direction perpendicular to an x-y plane (e.g., a plane defined by the x-axis and the y-axis).

The refractive anisotropy Δn of the splayed layers 122, 132, 222 and 232 may be in a range from about 0.05 to about 0.2, and the retardation Δnd of the splayed layers 122, 132, 222 and 232 may be in a range from about 50 nanometers (nm) to about 150 nanometers (nm).

The biaxial layers 123, 133, 223 and 233 may include rod-shaped liquid crystal molecules 400 that may be aligned substantially along a predetermined direction. In an embodiment, an optical axis, e.g., the longitudinal axes of the liquid crystal molecules 400, of the biaxial layers 123, 133, 223 and 233 may be substantially perpendicular to the splay plane of the splayed layer 122, 132, 222 or 232, as shown in FIG. 4.

The retardation in plane direction Ro (also referred to as "in-plane retardation") of the biaxial layer 123, 133, 223 or 233 may be in a range from about 120 nm to about 220 nm, and the retardation Rth in thickness direction (also referred to as "thickness retardation") may be in a range from about −80 nm to about −180 nm. Here, Ro=(Nx−Ny)d, and Rth=[Nz−(Nx+Ny)/2]d, where d denotes the thickness of the biaxial layer 123, 133, 223 or 233, and Nx, Ny and Nz denote the refractive indices in the x-axis, y-axis and z-axis directions, respectively. The retardations of the biaxial layers 123, 133, 223 and 233 may be determined based on various factors of the liquid crystal panels 110 and 210, e.g., properties of film materials, and also based on characteristics of the splayed layers 122, 132, 222 and 232.

The biaxial layers 123, 133, 223 and 233 may be substituted with A-plate that may have substantially the same retardations. A-plate may be a uniaxial phase retardation plate having an optical axis parallel to a surface thereof.

In an embodiment, the polarizers 126, 136, 226 and 236 may include, for example, polyvinyl alcohol ("PVA") and additional iodine. The protective layers 125, 127, 135, 137, 227 and 237 may support and protect the polarizers 126, 136, 226 and 236. In an embodiment, the protective layers 125, 127, 135, 137, 227 and 237 may include, for example, triacetyl cellulose ("TAC").

The splayed layers 122, 132, 222 and 232 in the LCDs 100 and 200 may compensate for vertical asymmetry of liquid crystal alignment, and the biaxial layers 123, 133, 223 and 233 may compensate for viewing angles in all directions.

Referring again to FIG. 3, when there is no electric field in the liquid crystal layer of the liquid crystal panels 110 and 210, although the pretilt may cause substantially slight asymmetry in the liquid crystal alignment, the asymmetry may be substantially ignorable. However, when the electric field is generated in the liquid crystal layer, the electric field may begin to tilt the liquid crystal molecules near a center in a direction. Then, one of opposing two longitudinal ends of the liquid crystal molecules may be seen when viewed from one of top and bottom directions (e.g., the bottom direction), while sides of the liquid crystal molecules may be seen from the other of the top and bottom directions (e.g., the top direction). When a display screen is viewed from a position where the sides of the liquid crystal molecules are seen, the brightness of the screen may increase or the contrast may decrease. When the screen is viewed from a position where the one of the longitudinal ends of the liquid crystal molecules are seen, the brightness of the screen may decrease, and the gray inversion may occur in the screen.

Referring now to FIG. 5, liquid crystal molecules 301, 302 and 302 of the splayed layers 122 and 132 may be aligned in a manner substantially opposite to a manner in which liquid crystal molecules 111, 112 and 113 of the liquid crystal panel 110 are aligned in the presence of electric field to compensate for the asymmetry of liquid crystal alignment of the liquid crystal panel 110. The liquid crystal molecules 301, 302 and 302 of the splayed layers 122 and 132 may align corresponding to respective liquid crystal molecules 111, 112 and 113 of the liquid crystal panel 110, which are connected in dotted lines such that the optical characteristics of LCDs is substantially improved.

Referring again to FIG. 4, the liquid crystal molecules 400 in the biaxial layers 123, 133, 223 and 233 are substantially uniformly aligned. In such an embodiment, longitudinal axes of the liquid crystal molecules 400 in the biaxial layers 123, 133, 223 and 233 may be substantially parallel to outer surfaces of the liquid crystal panel 110 or 210 and substantially perpendicular to the liquid crystal molecules in the liquid crystal panels 110 and 210. In such an embodiment, the longitudinal axes of the liquid crystal molecules 400 in the biaxial layers 123, 133, 223 and 233 may be substantially perpendicular to the outer surfaces of the liquid crystal panel 110 or 210 in the presence of the electric field such that the side viewing characteristics of the LCDs is substantially improved.

Hereinafter, an exemplary experiment on viewing characteristics of an embodiment of the LCD will now be described in detail with reference to FIGS. 6 to 8.

Figure 6:
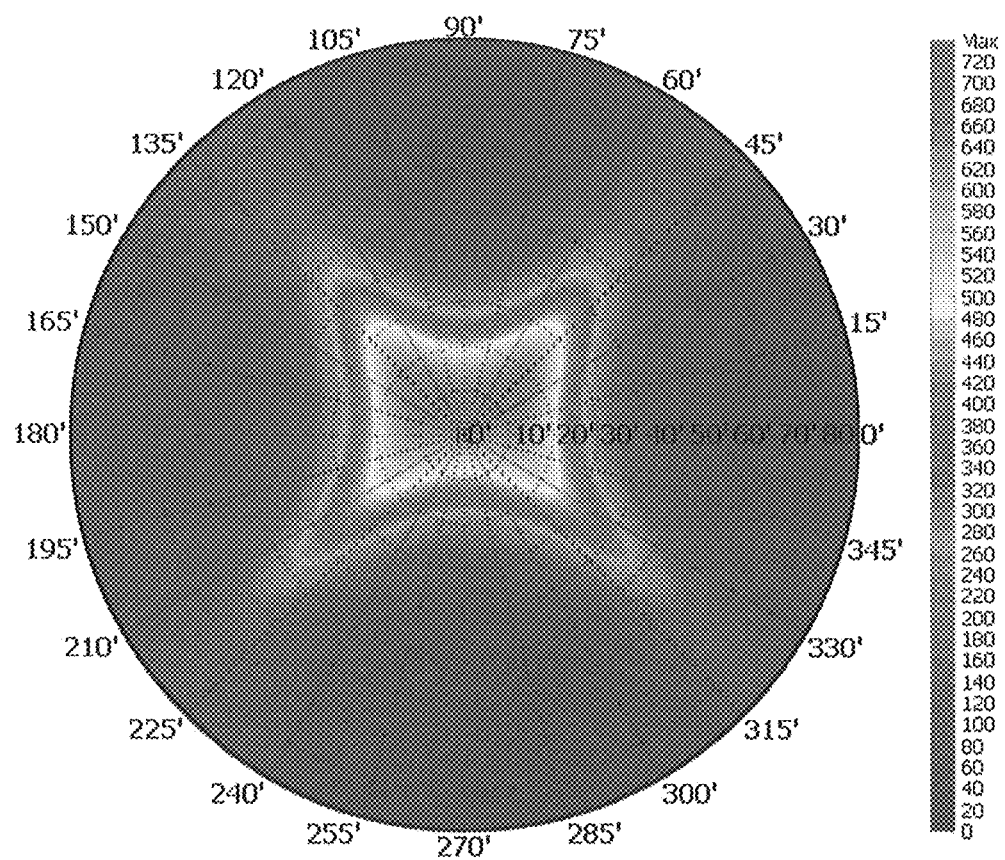
FIG. 6 is a graph illustrating contrast versus viewing angle showing viewing characteristics of a comparative example of the LCD.
Figure 7:
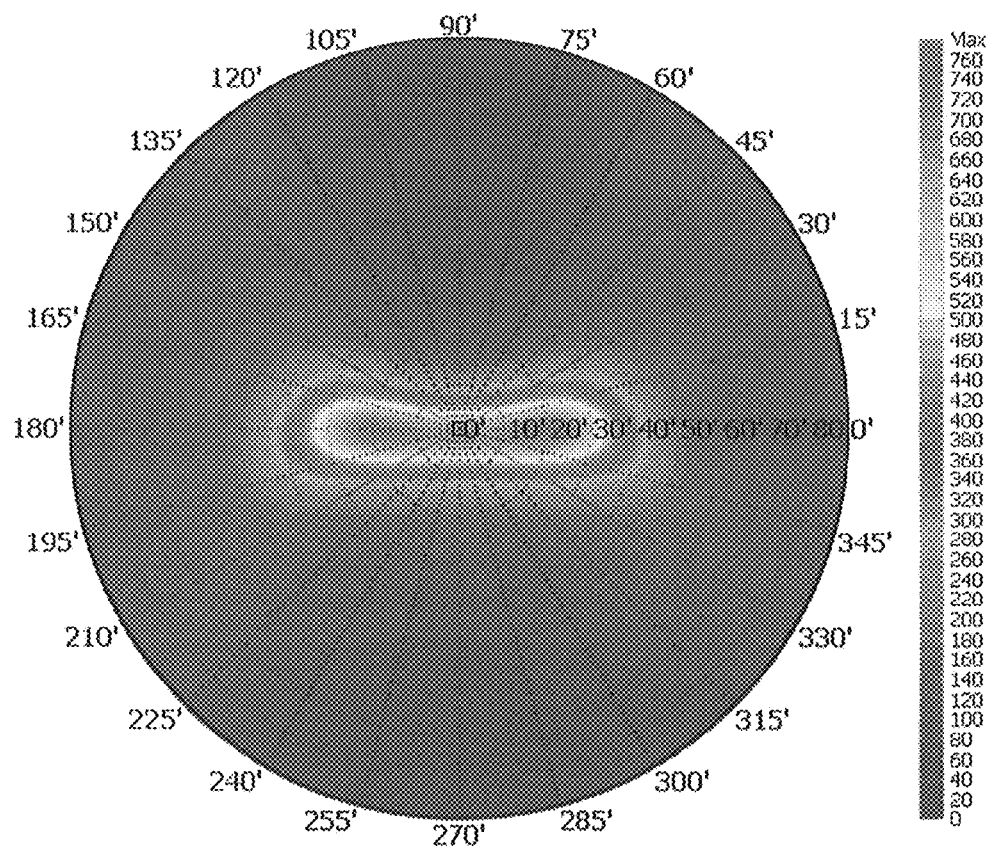
FIG. 7 is a graph illustrating contrast versus viewing angle showing viewing characteristics of an embodiment of the LCD.
Figure 8:
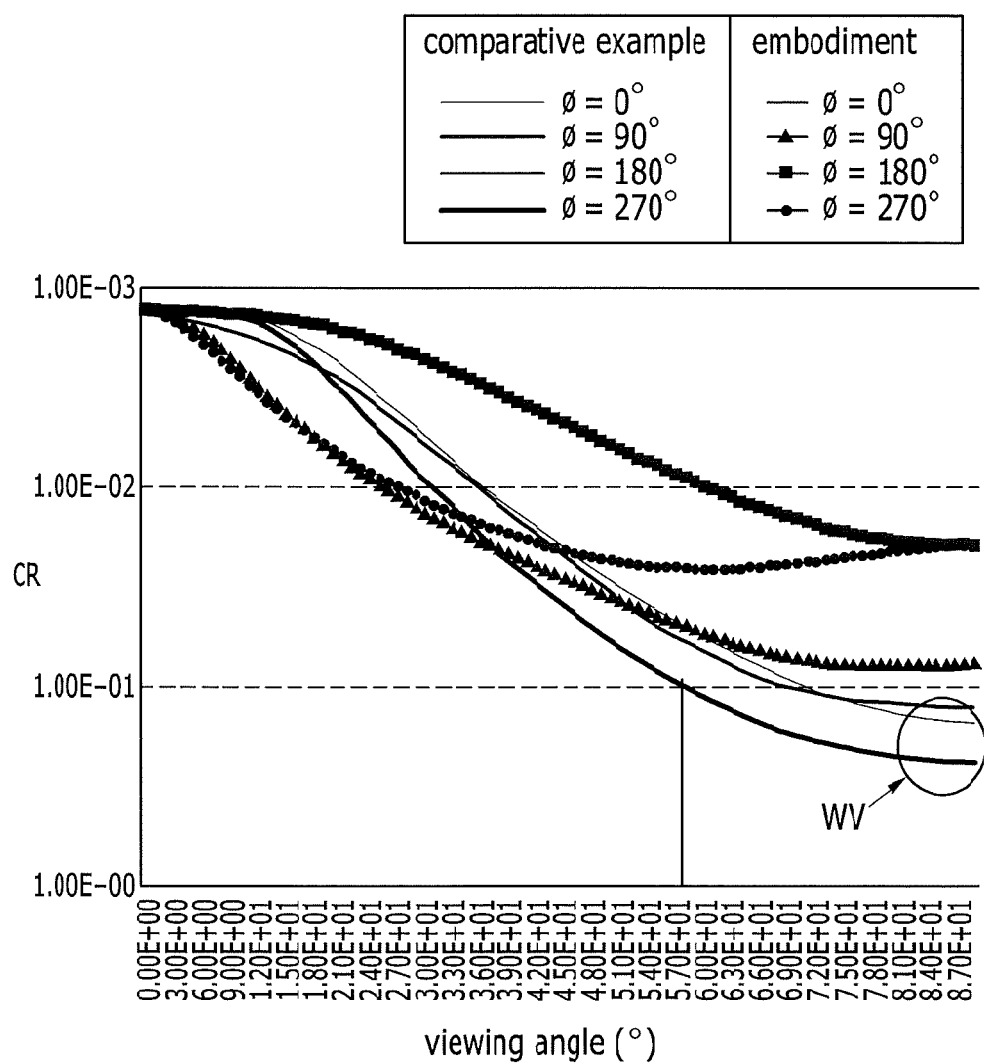
FIG. 8 is graph illustrating contrast ratio versus viewing angle showing viewing characteristics of the comparative example of the LCD and an embodiment of LCD shown in FIGS. 6 and 7.

FIG. 6 is a graph illustrating contrast versus viewing angle, showing viewing characteristics of a comparative example of the LCD, FIG. 7 is a graph illustrating contrast versus viewing angle, showing viewing characteristics of an embodiment of the LCD, and FIG. 8 is graph illustrating contrast ratio versus viewing angle, showing viewing characteristics of the comparative example of the LCD and the embodiment of the LCD shown in FIGS. 6 and 7.

The embodiment of the LCD includes the upper and lower splayed layers 122 and 132, as shown in FIG. 1, and each of the upper and lower splayed layers 122 and 132 has a thickness of about 1.6 microns (μm), extraordinary refractive index Ne of about 1.6038, and ordinary refractive index No of about 1.543. The azimuthal angles of the liquid crystal directors are about 45 degrees in the lower splayed layer 132, and about 135 degrees in the upper splayed layer 122. Polar angles of the liquid crystal directors in each of the upper and lower splayed layers 122 and 132 are in a range from about 24 degrees to about 79 degrees. Each of the biaxial layers 123 and 133, which has a structure similar to a structure of an A-plate, has a thickness of about 11.4 μm, in-plane retardation Ro of about 171 nm, thickness retardation Rth of about −125.4 nm, Nx of about 1.4985, Ny of about 1.4835, and Nz of about 1.48.

The comparative example of the LCD includes a compensation film including disc-shaped liquid crystal materials instead of rod-shaped splayed layers 122 and 132.

In the comparative example of the LCD, as shown in FIGS. 6 and 8, the reference viewing angles, where the contrast is about 10, for top, bottom, left and right directions are about 57 degrees, about 69 degrees, about 72 degrees, and about 72 degrees. In an embodiment, as shown in FIGS. 7 and 8, the reference viewing angle, where the contrast is about 10, is equal to or greater than about 89 degrees for all of the directions, e.g., the top, bottom, left and right directions. In another embodiment, e.g., the embodiment shown FIG. 2, the reference viewing angle of the LCD may be equal to or greater than about 89 degrees for all of the directions, similarly to the embodiment used in the exemplary experiment.

Hereinafter, another exemplary experiment on viewing characteristics will now be described in detail with reference to FIGS. 9 to 12.

Figure 9:
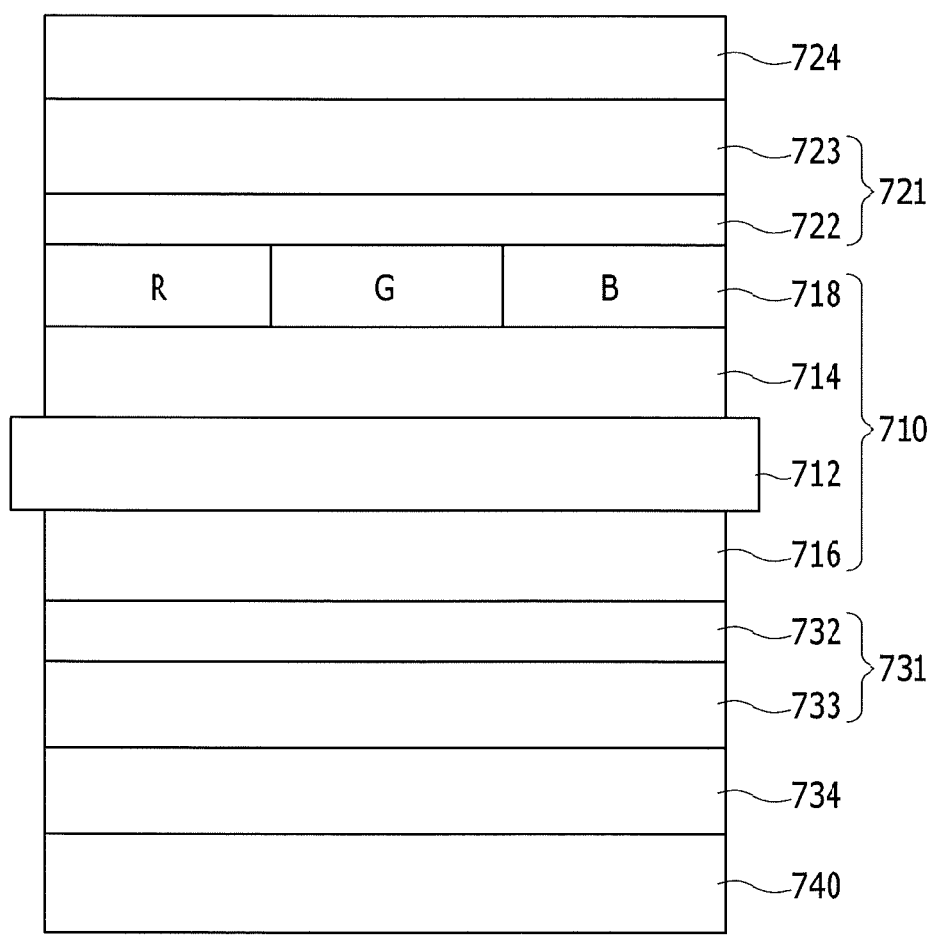
FIG. 9 is a schematic cross-sectional view of another embodiment of an LCD.
Figure 10:
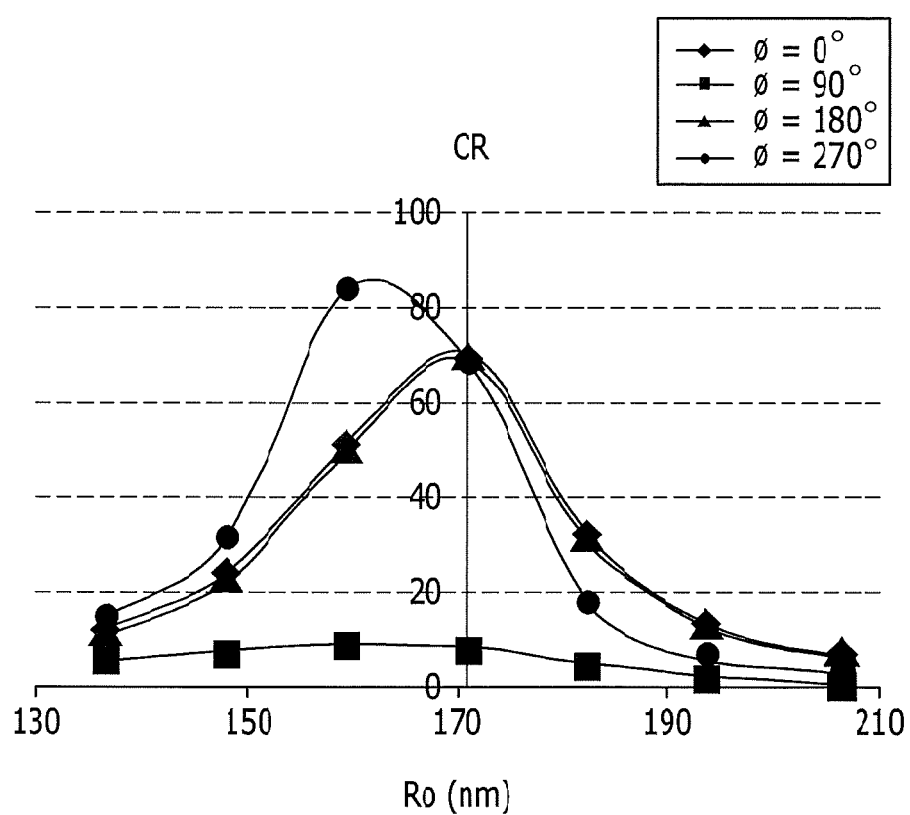
FIG. 10 is a graph showing contrast ratio ("CR") for various viewing angles as function of in-plane retardation Ro of a biaxial layer in the LCD shown in FIG. 9.
Figure 11:
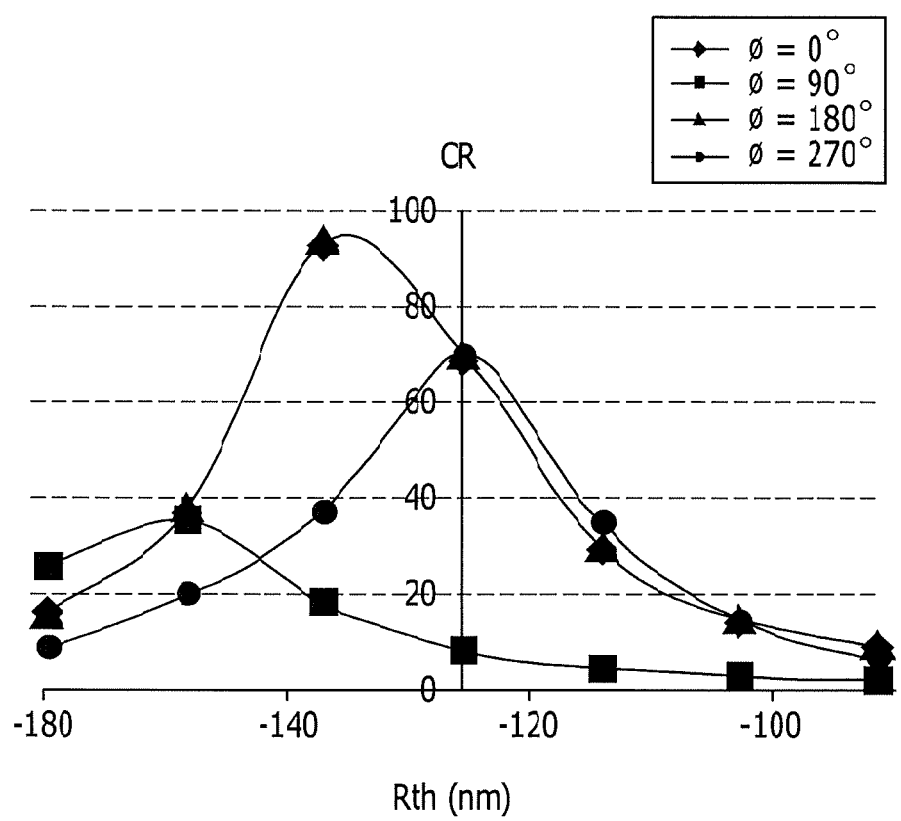
FIG. 11 is a graph showing CR for various viewing angles as function of thickness retardation Rth of a biaxial layer in the LCD shown in FIG. 9.
Figure 12:
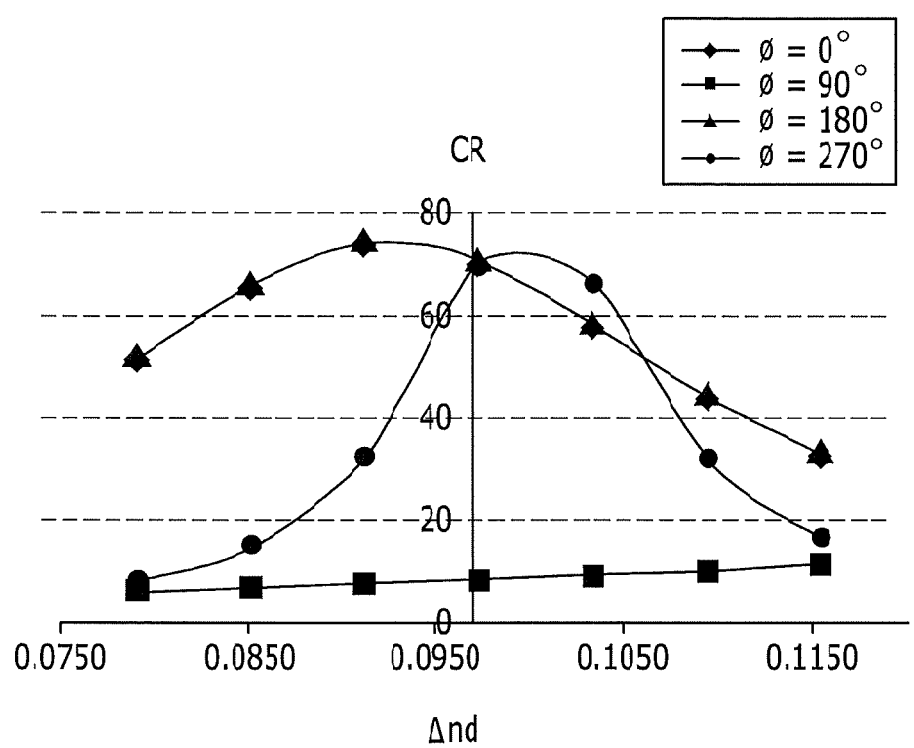
FIG. 12 is a graph showing CR for various viewing angles as function of retardation Δnd of a splayed layer in the LCD shown in FIG. 9.

FIG. 9 is a schematic cross-sectional view of another embodiment of the LCD, FIG. 10 is a graph showing contrast ratio ("CR") for various viewing angles as function of in-plane retardation Ro of a biaxial layer in the LCD shown in FIG. 9, FIG. 11 is a graph showing CR for various viewing angles as function of thickness retardation Rth of the biaxial layer in the LCD shown in FIG. 9, and FIG. 12 is a graph showing CR for various viewing angles as function of retardation Δnd of a splayed layer in the LCD shown in FIG. 9.

Referring to FIG. 9, an embodiment of the LCD includes a liquid crystal panel 710, a pair of optical compensation films 721 and 731, a pair of polarizing films 724 and 734, and a substrate 740.

The liquid crystal panel 710 of the embodiment includes upper and lower electrodes 714 and 716, a liquid crystal layer 712 disposed between the upper and lower electrodes 714 and 716, and a plurality of color filters 718 disposed on the upper electrode 714. The color filters 718 may include a red color filter R, a green color filter G, and a blue color filter B.

In an embodiment, the characteristic parameters of liquid crystal material of the liquid crystal panel 710 are as follows:
splay, twist, bend elastic coefficients: K11=11.4 piconewtons (pN), K22=4.8 pN, K33=11.5 pN;
permittivity: $\epsilon_\parallel$=7.7, $\epsilon_\perp$=3.1;
pitch: −70 μm;
thickness: 3.2 μm;
refractive index: Ne=1.605096, No=1.480096;
refractive anisotropy Δn: 0.125; and
retardation: 400 nm.

Each of the compensation films 721 and 731 of the embodiment includes splayed layers 722 and 732, and biaxial layers 723 and 733.

In the embodiment of the LCD, front contrast ratio and lateral 89-degree contrast ratio for the in-plane retardation Ro of the biaxial layer 723 or 733 are as shown in Table 1 and FIG. 10.

TABLE 1

| | | | | | | | | lateral 89-degree CR | | |
|---|---|---|---|---|---|---|---|---|---|---|
| Nx | Ny | Nz | d (μm) | Ro (nm) | Rth (nm) | front CR | φ = 0 | φ = 90 | φ = 180 | φ = 270 |
| 1.497 | 1.485 | 1.48 | 11.4 | 136.708 | −125.316 | 687 | 12.9 | 5.6 | 12.9 | 15.1 |
| 1.4975 | 1.4845 | 1.48 | 11.4 | 148.119 | −125.331 | 687 | 24.1 | 7.4 | 24 | 31.3 |
| 1.498 | 1.484 | 1.48 | 11.4 | 159.528 | −125.343 | 687 | 51.5 | 8.9 | 51.4 | 84.2 |
| 1.4985 | 1.4835 | 1.48 | 11.4 | 170.933 | −125.351 | 687 | 70.2 | 8.3 | 70.9 | 69.4 |
| 1.499 | 1.483 | 1.48 | 11.4 | 182.338 | −125.357 | 687 | 32.5 | 5 | 33 | 18.4 |
| 1.4995 | 1.4825 | 1.48 | 11.4 | 193.741 | −125.362 | 687 | 13.3 | 2.4 | 13.5 | 6.3 |
| 1.5 | 1.482 | 1.48 | 11.5 | 206.44 | −126.158 | 687 | 6.5 | 1.1 | 6.6 | 2.6 |

In Table 1, φ denotes polar angle.

As shown in Table 1 and FIG. 10, the contrast ratio in various angles was substantially improved when the in-plane retardation Ro of the biaxial layer 723 or 733 was about 170 nm, or when the in-plane retardation Ro of the biaxial layer 723 or 733 is in a range of about (170±20) nm. As described above, the retardation of the liquid crystal material in the liquid crystal panel 710 is about 400 nm. In an embodiment, the retardation of the liquid crystal material in the liquid crystal panel 710 may be in a range of about (400±30) nm, and an effective range of the in-plane retardation Ro of the biaxial layer 723 or 733 may be extended to a range of about (170±50) nm, i.e., a range from about 120 nm to about 220 nm considering the range of the retardation of the liquid crystal material.

In the embodiment of the LCD, the front contrast ratio and the lateral 89-degree contrast ratio for the thickness retardation Rth of the biaxial layer 723 or 733 are as shown in Table 2 and FIG. 11.

TABLE 2

| | | | | | | | | lateral 89-degree CR | | |
|---|---|---|---|---|---|---|---|---|---|---|
| Nx | Ny | Nz | d (μm) | Ro (nm) | Rth (nm) | front CR | φ = 0 | φ = 90 | φ = 180 | φ = 270 |
| 1.4985 | 1.4835 | 1.477 | 11.4 | 136.708 | −159.6 | 687 | 15.7 | 25.6 | 15.8 | 8.9 |
| 1.4985 | 1.4835 | 1.478 | 11.4 | 148.119 | −148.2 | 687 | 38 | 35.3 | 38.2 | 19.4 |
| 1.4985 | 1.4835 | 1.479 | 11.4 | 159.528 | −136.8 | 687 | 93.5 | 18.2 | 94.2 | 37.4 |
| 1.4985 | 1.4835 | 1.48 | 11.4 | 170.933 | −125.4 | 687 | 70.2 | 8.3 | 70.9 | 69.4 |
| 1.4985 | 1.4835 | 1.481 | 11.4 | 182.338 | −114 | 687 | 29.1 | 4.5 | 29.4 | 34.7 |
| 1.4985 | 1.4835 | 1.482 | 11.4 | 193.741 | −102.6 | 687 | 14.6 | 2.9 | 14.7 | 13.8 |
| 1.4985 | 1.4835 | 1.483 | 11.4 | 206.44 | −91.2 | 687 | 8.7 | 2.1 | 8.8 | 6.9 |

As shown in Table 2 and FIG. 11, the contrast ratio in various angles is substantially improved when the thickness retardation Rth of the biaxial layer 723 or 733 is about −130 nm, or when the thickness retardation Rth is in a range of about (−130±20) nm. Considering the retardation of the liquid crystal material that may be in a range as described above, an effective range of the thickness retardation Rth of the biaxial layer 723 or 733 may be extended to a range of about (−130±50) nm, i.e., a range from about −80 nm to about −180 nm.

In the embodiment, the front contrast ratio and the lateral 89-degree contrast ratio for the retardation Δnd of the splayed layer 722 or 732 were as shown in Table 3 and FIG. 12.

TABLE 3

| Ne | No | Δn | d (μm) | Δnd (nm) | Ro (nm) | Rth (nm) | front CR | lateral 89-degree CR | | | |
|---|---|---|---|---|---|---|---|---|---|---|---|
| | | | | | | | | φ = 0 | φ = 90 | φ = 180 | φ = 270 |
| 1.6038 | 1.543 | 0.0608 | 1.3 | 79 | 136.708 | −79.04 | 687 | 51.1 | 6.3 | 51.9 | 8.1 |
| 1.6038 | 1.543 | 0.0608 | 1.4 | 85.1 | 148.119 | −85.12 | 687 | 65.3 | 6.9 | 66.3 | 14.9 |
| 1.6038 | 1.543 | 0.0608 | 1.5 | 91.2 | 159.528 | −91.2 | 687 | 73.8 | 7.5 | 74.8 | 32.2 |
| 1.6038 | 1.543 | 0.0608 | 1.6 | 97.3 | 38.563 | −97.28 | 687 | 70.2 | 8.3 | 70.9 | 69.4 |
| 1.6038 | 1.543 | 0.0608 | 1.7 | 103.4 | 182.338 | −103.36 | 687 | 57.8 | 9.1 | 58.2 | 65.9 |
| 1.6038 | 1.543 | 0.0608 | 1.8 | 109.4 | 193.741 | −109.44 | 687 | 44 | 10.1 | 44.2 | 32 |
| 1.6038 | 1.543 | 0.0608 | 1.9 | 115.5 | 206.44 | −115.52 | 687 | 32.7 | 11.3 | 32.9 | 16.6 |

As shown in Table 3 and FIG. 12, the contrast ratio in various angles was substantially improved when the retardation Δnd of the splayed layer 722 and 732 is about 100 nm, or when the retardation Δnd of the splayed layer 722 and 732 is in a range of about (100±20) nm. Considering the retardation of the liquid crystal material that may be in a range as described above, an effective range of the retardation Δnd of the splayed layer 722 and 732 may be extended to a range of about (100±50) nm, i.e., a range from about 50 nm to about 150 nm.

Referring now to FIG. 13 and again to FIGS. 1 to 3, an embodiment of a compensation film for an LCD will be described in detail.

Figure 13:
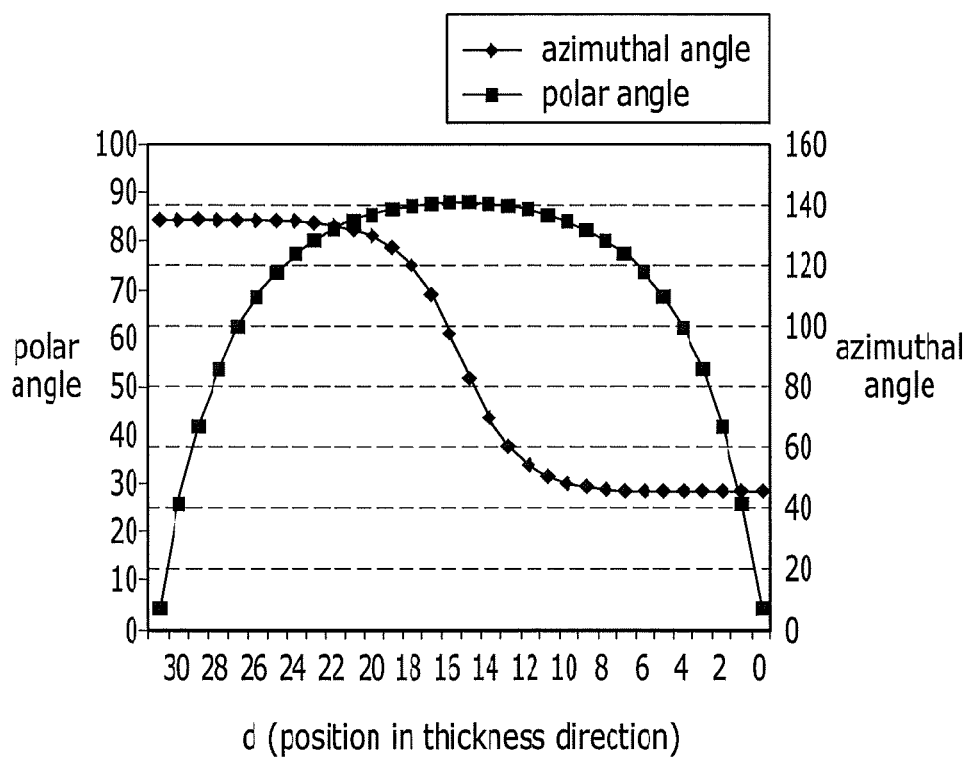
FIG. 13 is a graph showing azimuthal angle and polar angle of a liquid crystal molecule of the LCD shown in FIGS. 1 and 2 in the presence of applied voltage.

FIG. 13 is a graph showing azimuthal angle and polar angle of an embodiment of a liquid crystal molecule of the LCD shown in FIGS. 1 and 2 when a voltage is generated.

When an electric field is applied to the liquid crystal layer of the liquid crystal panel 110 or 210 shown in FIGS. 1 and 2, the liquid crystal molecules near the center of the liquid crystal layer may be aligned substantially in a vertical direction, e.g., a direction vertical to a surface of the substrates of the liquid crystal layer, while the liquid crystal molecules near the surfaces of the substrates of the liquid crystal panel 110 or 210 may not tend to be changed from initial orientations where they are aligned substantially parallel to the surfaces of the substrates. In such an embodiment, as shown in FIG. 13, the polar angle of the liquid crystal molecules near the surface of the substrates may be about 90 degrees and the polar angle of the liquid crystal molecules near the center of the liquid crystal layer may be about zero (0) degree, and may substantially continuously and gradually changed from the substrate surface to the layer center. Here, the definition of the polar angle is substantially the same as the definition of the polar angle shown in FIG. 4.

The azimuthal angles of the liquid crystal molecules near the surfaces of the two substrates are twisted by about a right angle. In FIG. 13, when an edge of a rectangular shaped surface of the liquid crystal panel 110 or 210 is defined as a reference line, i.e., zero (0) degree, the azimuthal angles of the liquid crystal molecules near the surfaces of the two substrates are about 45 degrees and about 135 degrees. The liquid crystal molecules near the substrate surfaces may maintain a homogeneous alignment thereof and do not change azimuthal orientation thereof even when a strong vertical electric field is applied thereto. In such an embodiment, a twisted alignment of the liquid crystal molecules may change the polarization of incident light.

In one embodiment, for example, in a normally white mode, where the transmission axes of the upper polarizing film 124 or 224 are in a right angle, i.e., an angle of about 90 degrees, with respect to the transmission axes of the lower polarizing film 134 and 234, a substantially strong vertical electric field applied to the liquid crystal layer may cause a black state of the LCD. The change of the polarization of the incident light may cause light leakage, and thus the brightness in the black state may increase such that the contrast ratio is substantially decreased.

In an embodiment, the twisted orientations of the liquid crystal molecules in the splayed layers 122 and 132 or 222 and 232 may compensate for the light leakage due to the twisted orientations of the liquid crystal molecules in the liquid crystal panel 110 or 210. In an LCD, a substantial portion of the liquid crystal molecules, which are arranged in the thickness direction, in the splayed layers 122, 132, 222 and 232 may have substantially the same azimuthal angle, while having gradually changing polar angles. In an embodiment, however, the azimuthal angles of the liquid crystal molecules in the splayed layers 122 and 132 or 222 and 232 may slightly vary in addition to the variation of the polar angles thereof. The twist angle, which is the difference between the azimuthal angles of the liquid crystal molecules at opposing surfaces of the splayed layers 122, 132, 222 and 232, may be in a range from about 2 degrees to about 10 degrees.

According to another embodiment, the splayed layers 122, 132, 222 and 232 may include splay-twist aligned discotic liquid crystal molecules instead of rod-shaped liquid crystal molecules. In such an embodiment, the primary axes of the discotic liquid crystal molecules may be aligned with the longitudinal direction of the rod-shaped liquid crystal molecules shown in FIG. 4, and the twist angle may be in a range from about 2 degrees to about 10 degrees.

Hereinafter, an exemplary experiment on viewing characteristics of an embodiment of the LCD will now be described in detail with reference to FIGS. 14 to 16.

Figure 14:
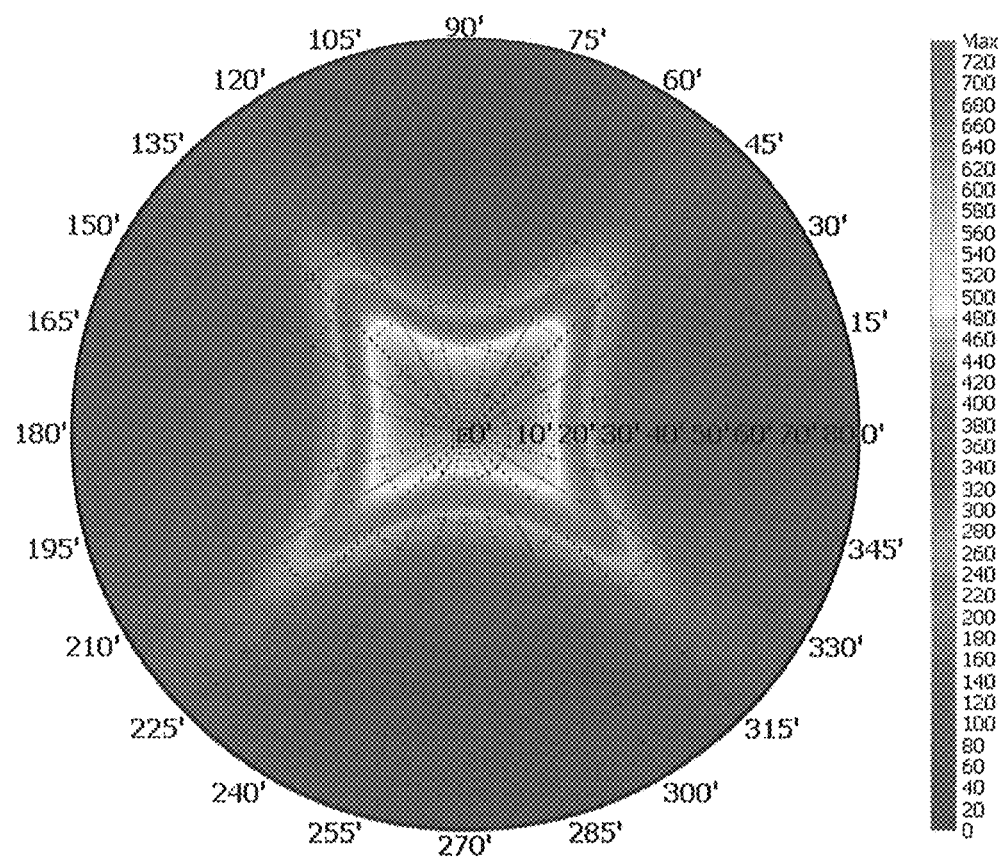
FIG. 14 is a graph illustrating contrast versus viewing angle showing viewing characteristics of a comparative example of the LCD.
Figure 15:
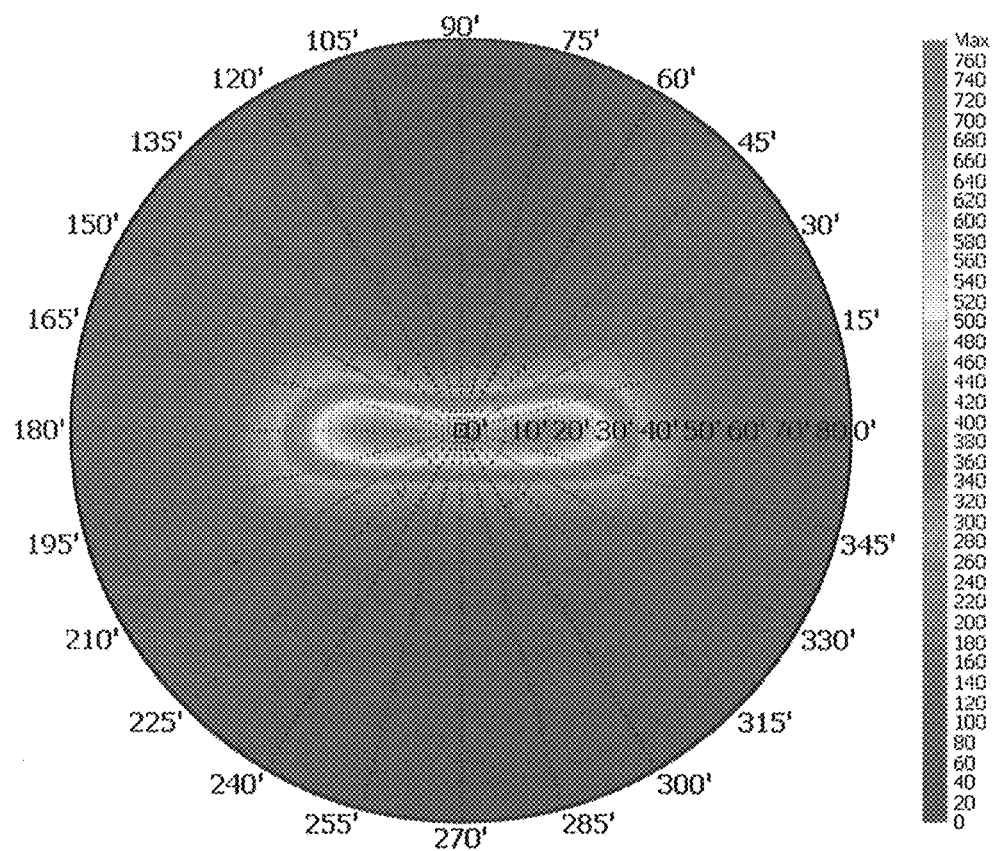
FIG. 15 is a graph illustrating contrast versus viewing angle showing viewing characteristics of an embodiment of the LCD.
Figure 16:
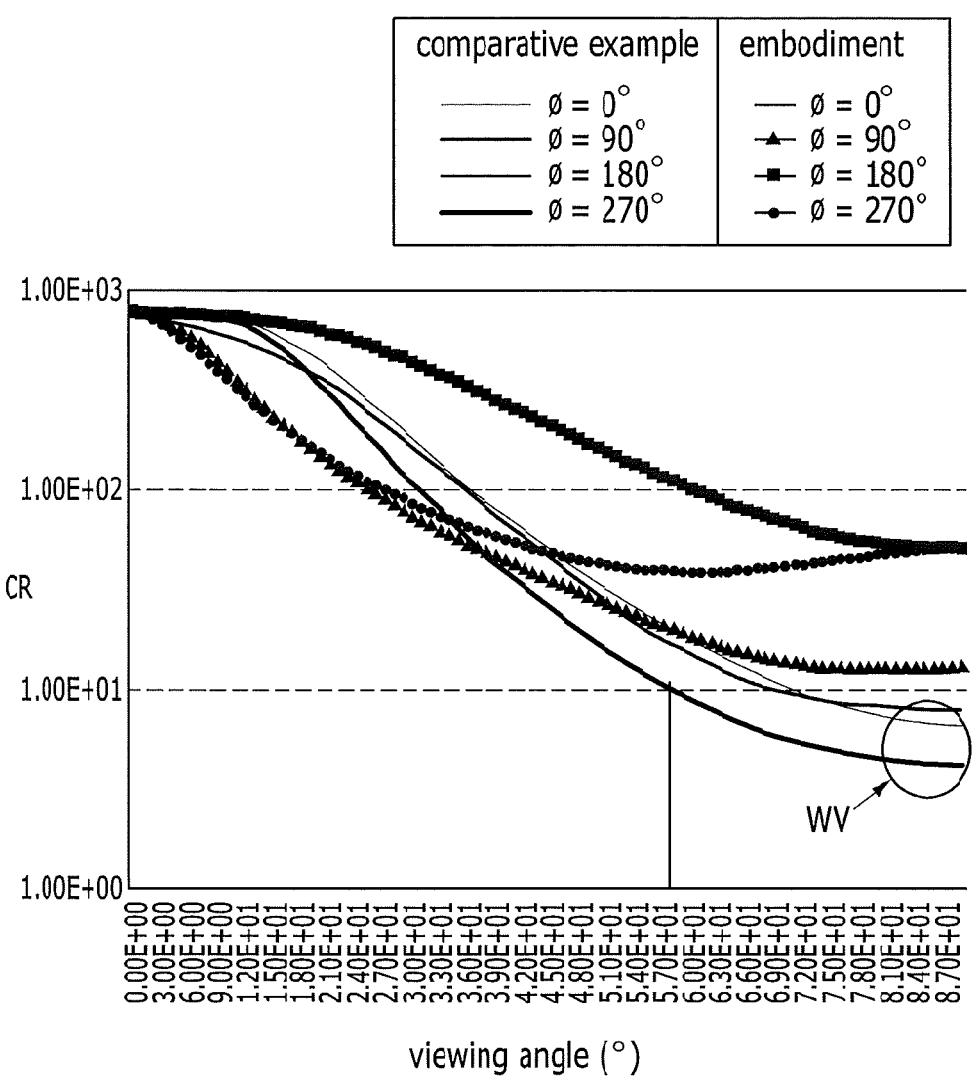
FIG. 16 is graph illustrating contrast ratio versus viewing angle showing viewing characteristics of the comparative LCD and the embodiment of the LCD shown in FIGS. 15 and 16.

FIG. 14 is a graph illustrating contrast versus viewing angle, showing viewing characteristics of a comparative example of the LCD, FIG. 15 is a graph illustrating contrast versus viewing angle, showing viewing characteristics of an embodiment of the LCD, and FIG. 16 is graph illustrating contrast versus viewing angle, showing viewing characteristics of the comparative example of the LCD and the embodiment of the LCD shown in FIGS. 14 and 15.

The embodiment of the LCD has a structure substantially the same as the structure of the embodiment shown in FIG. 1. In such an embodiment, each of the splayed layers 122 and 132 has a thickness of about 1.6 μm, extraordinary refractive index Ne of about 1.6038, and ordinary refractive index No of about 1.543. The azimuthal angle and the polar angle of the liquid crystal director in the lower splayed layer 132 are varied from about 45 degrees and about 24 degrees to about 42 degrees and about 79 degrees, respectively. In such an embodiment, the azimuthal angle and the polar angle of the liquid crystal director in the upper splayed layer 122 are varied from about 135 degrees and about 24 degrees to about 138 degrees and about 79 degrees, respectively. Each of the biaxial layers 123 and 133, which had a structure substantially similar to an A-plate, has a thickness of about 11.4 µm, in-plane retardation Ro of about 171 nm, thickness retardation Rth of about −125.4, Nx of about 1.4985, Ny of about 1.4835, and Nz of about 1.48.

The comparative example of the LCD includes a compensation film including discotic liquid crystal material without twist instead of rod-shaped splayed layers 122 and 132 with twist.

In the comparative example of the LCD, as shown in FIGS. 14 and 16, the reference viewing angles, where the contrast is about 10, for the top, bottom, left, and right directions are about 57 degrees, about 69 degrees, about 72 degrees, and about 72 degrees. In the embodiment, as shown in FIGS. 15 and 16, the reference viewing angle, where the contrast is about 10, are equal to or greater than about 89 degrees for all of the top, bottom, left, and right directions.

Hereinafter, an exemplary experiment on a front contrast ratio will now be described in detail with reference to FIGS. 17 to 19.

Figure 17:
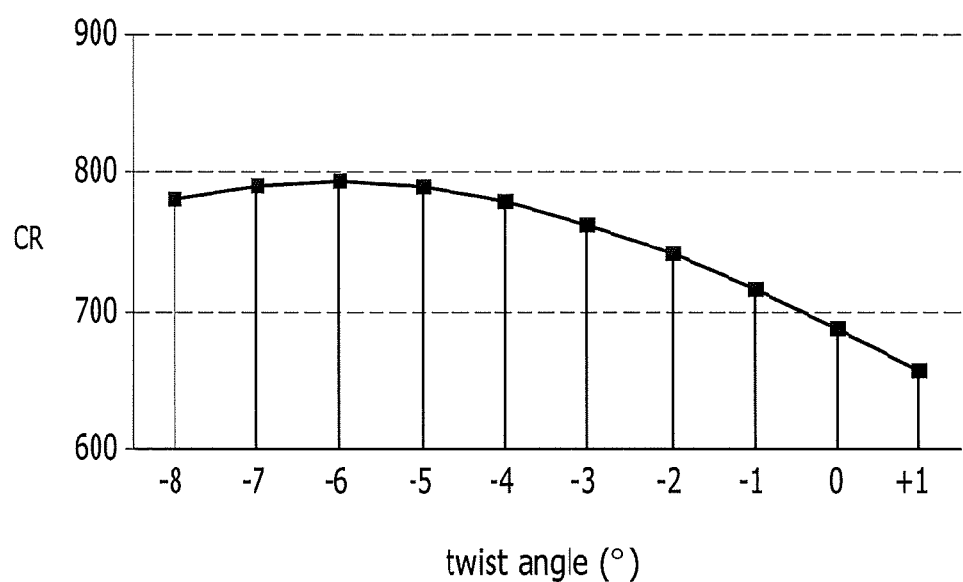
FIG. 17 is a graph showing a front contrast ratio as function of twist angle of a rod-shaped splayed layer with twist.
Figure 18:
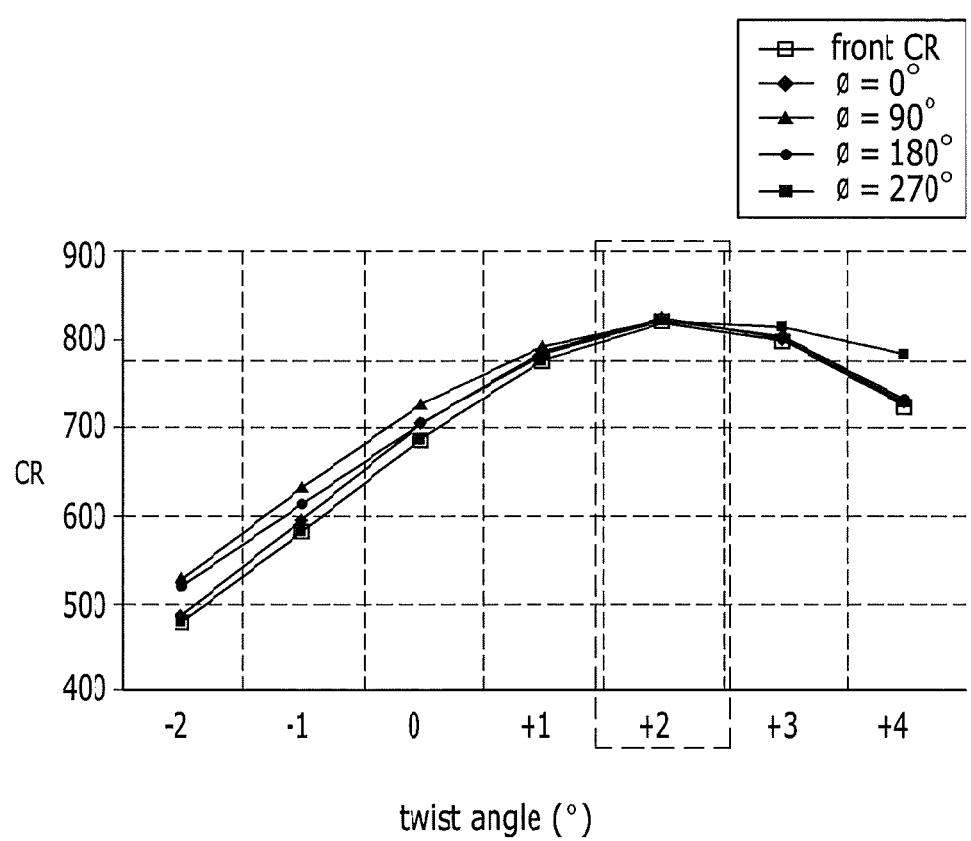
FIG. 18 is a graph showing a front contrast ratio as function of twist angle of a discotic splayed layer with twist.
Figure 19:
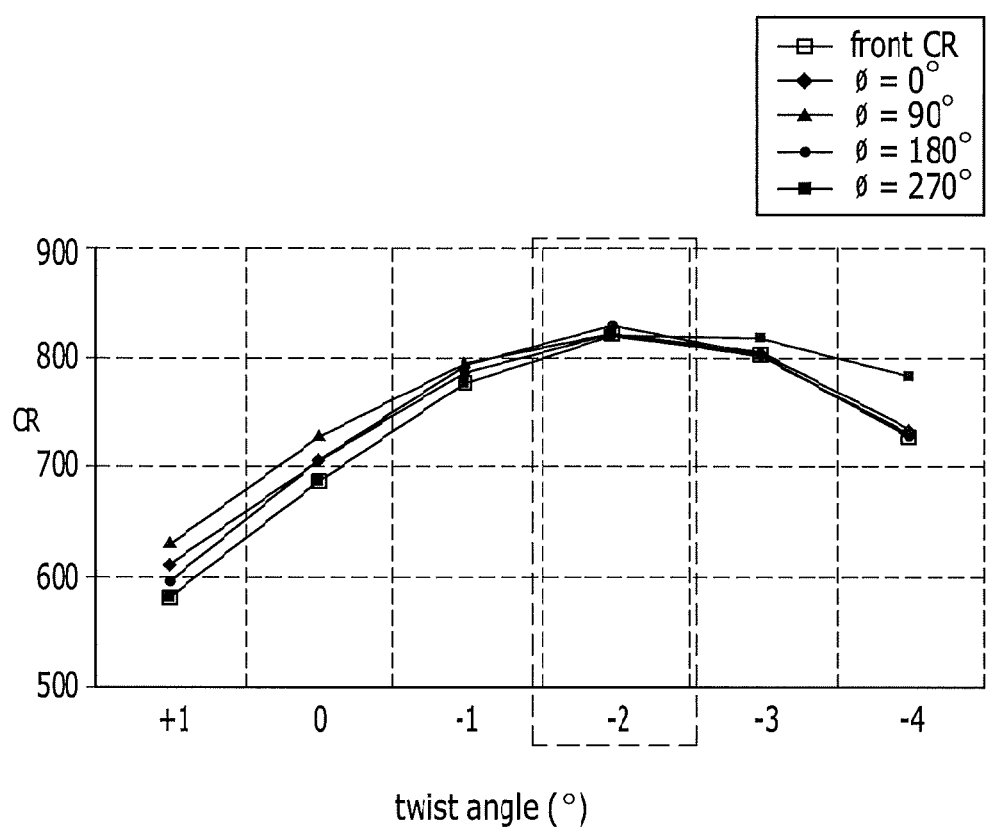
FIG. 19 is a graph showing a front contrast ratio as function of twist angle of a discotic splayed layer with twist.

FIG. 17 is a graph showing a front contrast ratio as function of twist angle of a rod-shaped splayed layer with twist, and each of FIGS. 18 and 19 is a graph showing a front contrast ratio as function of twist angle of a discotic splayed layer with twist.

FIG. 17 shows the front contrast ratio with respect to various twist angles of the splayed layer 122 of the upper compensation film 121 and without twist in the splayed layer 132 of the lower compensation film 131 in FIG. 1. As shown in FIG. 17, the addition of the twist may increase the front contrast ratio by about 15% to about 20%, and the front contrast ratio may have a peak when the twist angle is about −6.

When twist exists in both the upper and lower splayed layers 122 and 132, the front contrast ratio substantially increases when the sum of the twist angles is about 6 degrees.

FIGS. 18 and 19 shows the front contrast ratio with respect to various twist angles of the splayed layers 122 and 132 including the discotic liquid crystal molecules. In such an embodiment, the biaxial layers 123 and 133 may be omitted.

FIG. 18 was obtained by fixing the azimuthal angle of the lower splayed layer 132 and giving twist to the upper splayed film 122, and FIG. 19 was obtained by fixing the azimuthal angle of the upper splayed film 122 and giving twist to the lower splayed layer 132. In FIG. 18, the azimuthal angle of the liquid crystal molecules disposed near the top surface of the upper splayed film 122 was fixed to about −135 degrees, and the azimuthal angle of the liquid crystal molecules disposed near the bottom surface was varied. In FIG. 19, the azimuthal angle of the liquid crystal molecules disposed near the bottom surface of the lower splayed layer 132 was fixed to about −45 degrees, and the azimuthal angle of the liquid crystal molecules disposed near the top surface was varied.

As shown in FIGS. 18 and 19, the splay-twist alignment of the discotic liquid crystal molecules may increase the contrast ratio for all directions, and in particular, the front contrast ratio may increase by about 20%.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A twisted nematic liquid crystal display comprising:
   a twisted nematic mode liquid crystal panel having a first surface and a second surface;
   a first compensation film disposed on the first surface of the twisted nematic mode liquid crystal panel;
   a first polarizing film disposed on an outer surface of the first compensation film;
   a second compensation film disposed on the second surface of the panel; and
   a second polarizing film disposed on an outer surface of the second compensation film,
   wherein the compensation film comprising:
      a first layer comprising splayed rod-shaped nematic liquid crystal material; and
      a second layer disposed on an outer surface of the first layer and comprising a biaxial layer,
   wherein an optical axis of the second layer is at an angle of about 90 degrees with respect to a splay plane of the first layer, and
   wherein the splay plane of the first layer is substantially parallel to a vector sum of rubbing directions of the twisted nematic mode liquid crystal panel,
   wherein the second compensation film comprises:
      a third layer comprising splayed rod-shaped nematic liquid crystal material; and
      a fourth layer disposed on an outer surface of the third layer and comprising a second biaxial layer,
   wherein an optical axis of the fourth layer is at an angle of about 90 degrees with respect to a splay plane of the third layer,
   wherein the splay plane of the third layer is substantially parallel to the splay plane of the first layer.

2. The liquid crystal display of claim 1, wherein liquid crystal molecules of the first layer have polar angles decreasing as moving toward the second layer.

3. The liquid crystal display of claim 2, wherein a difference between the polar angles of the liquid crystal molecules at opposing surfaces of the first layer is equal to or greater than about 30 degrees.

4. The liquid crystal display of claim 3, wherein retardation of the second layer in plane direction is in a range from about 120 nanometers to about 220 nanometers,
   retardation of the second layer in thickness direction is in a range from about −80 nanometers to about −180 nanometers, and
   retardation of the first layer is about 50 nanometers to about 150 nanometers.

5. The liquid crystal display of claim 1, wherein the splayed rod-shaped nematic liquid crystal material of the first layer has a twist alignment with a twist angle in a range from about 2 degrees to about 10 degrees.

6. The liquid crystal display of claim 5, wherein the first polarizing film comprises:
   a polarizer disposed on an outer surface of the second layer; and
   a first protective layer disposed on an outer surface of the polarizer.

7. The liquid crystal display of claim 6, wherein the first polarizing film further comprises a second protective layer disposed between the polarizer and the second layer.

8. The liquid crystal display of claim 1, wherein the first polarizing film comprises:
   a polarizer disposed on an outer surface of the second layer; and a first protective layer disposed on an outer surface of the polarizer.

9. The liquid crystal display of claim 8, wherein the first polarizing film further comprises a second protective layer disposed between the polarizer and the second layer.

10. The liquid crystal display of claim 1, wherein the splay plane of the first layer makes at an angle of about 45 degrees with the rubbing direction.

11. A twisted nematic liquid crystal display comprising:
a twisted nematic mode liquid crystal panel having a first surface and a second surface opposing the first surface;
a first compensation film disposed on the first surface of the panel;
a first polarizing film disposed on an outer surface of the first compensation film;
a second compensation film disposed on the second surface of the panel; and
a second polarizing film disposed on an outer surface of the second compensation film,
wherein the first compensation film comprises:
a first layer comprising discotic nematic liquid crystal material with a first splay-twist alignment; and
a second layer disposed on an outer surface of the first layer and comprising a first biaxial layer,
wherein an optical axis of the second layer is at an angle of about 90 degrees with respect to a splay plane of the first layer,
wherein the splay plane of the first layer is substantially parallel to a vector sum of rubbing directions of the twisted nematic mode liquid crystal panel,
wherein the second compensation film comprises:
a third layer comprising discotic nematic liquid crystal material with a second splay-twist alignment; and
a fourth layer disposed on an outer surface of the third layer and comprising a second biaxial layer,
wherein an optical axis of the fourth layer is at an angle of about 90 degrees with respect to a splay plane of the third layer,
wherein the splay plane of the third layer is substantially parallel to the splay plane of the first layer, and
wherein the twist angle of the discotic nematic liquid crystal material in the first layer is in a range from about 2 degrees to about 10 degrees.

* * * * *